(12) United States Patent
Larsen

(10) Patent No.: US 11,745,701 B2
(45) Date of Patent: Sep. 5, 2023

(54) SYSTEM FOR DETECTING WINDOW OR GLASS PANEL DAMAGE

(71) Applicant: DTECTO AS, Trondheim (NO)

(72) Inventor: Tom Roger Larsen, Kattem (NO)

(73) Assignee: DTECTO AS, Trondheim (NO)

( * ) Notice: Subject to any disclaimer, the term of this patent is extended or adjusted under 35 U.S.C. 154(b) by 0 days.

(21) Appl. No.: 16/772,944

(22) PCT Filed: Dec. 21, 2018

(86) PCT No.: PCT/NO2018/050323
§ 371 (c)(1),
(2) Date: Jun. 15, 2020

(87) PCT Pub. No.: WO2019/125179
PCT Pub. Date: Jun. 27, 2019

(65) Prior Publication Data
US 2021/0162950 A1 Jun. 3, 2021

(30) Foreign Application Priority Data
Dec. 22, 2017 (NO) .................................. 20172045

(51) Int. Cl.
| B60R 25/34 | (2013.01) |
| B60R 25/10 | (2013.01) |
| G07C 5/00 | (2006.01) |
| G07C 5/08 | (2006.01) |
| G08B 13/04 | (2006.01) |
| E04H 1/12 | (2006.01) |

(52) U.S. Cl.
CPC .......... *B60R 25/34* (2013.01); *B60R 25/1004* (2013.01); *G07C 5/008* (2013.01); *G07C 5/0825* (2013.01); *G08B 13/04* (2013.01); *E04H 1/1211* (2013.01)

(58) Field of Classification Search
CPC ..... B60R 25/34; B60R 25/1004; G07C 5/008; G07C 5/0825; G07C 5/0808; G08B 13/04; E04H 1/1211
See application file for complete search history.

(56) References Cited

U.S. PATENT DOCUMENTS

| 4,837,558 | A | * | 6/1989 | Abel | ...................... G08B 13/04 340/550 |
| 5,471,195 | A | * | 11/1995 | Rickman | ............ G08B 13/1672 340/556 |
| 5,510,765 | A | | 4/1996 | Madau | |
| 5,543,783 | A | * | 8/1996 | Clark | ..................... G08B 13/04 73/587 |
| 5,627,509 | A | | 5/1997 | Gajewski et al. | |
| 5,680,096 | A | * | 10/1997 | Grasmann | ........... B60R 25/1004 340/541 |

(Continued)

OTHER PUBLICATIONS

International Search Report and Written Opinion dated Apr. 18, 2019.

*Primary Examiner* — Ojiako K Nwugo
(74) *Attorney, Agent, or Firm* — Alix, Yale & Ristas, LLP

(57) ABSTRACT

System for detecting window or glass panel damage, wherein the system comprises at least one sensor devices arranged to interior or exterior surface of a vehicle window or bus shelter glass panel for monitoring, registering and alerting on-line, in real-time, when and if a vehicle window or bus shelter glass panel damage is detected.

17 Claims, 6 Drawing Sheets

(56) References Cited

U.S. PATENT DOCUMENTS

| | | | |
|---|---|---|---|
| 6,493,687 B1* | 12/2002 | Wu | G08B 13/04 |
| | | | 340/544 |
| 9,076,277 B2 | 7/2015 | Delong | |
| 10,713,727 B1* | 7/2020 | Floyd | H04L 9/0637 |
| 10,841,122 B1* | 11/2020 | Jensen | H04L 41/0883 |
| 10,858,011 B1* | 12/2020 | Christensen | B60R 21/20 |
| 2001/0033227 A1* | 10/2001 | Eskildsen | G08B 13/1672 |
| | | | 340/544 |
| 2004/0081020 A1 | 4/2004 | Blosser et al. | |
| 2005/0192727 A1* | 9/2005 | Shostak | G07C 5/0808 |
| | | | 701/1 |
| 2009/0212943 A1 | 8/2009 | Burnard et al. | |
| 2014/0067199 A1* | 3/2014 | Jiao | B64C 1/1476 |
| | | | 701/34.4 |
| 2014/0201022 A1 | 7/2014 | Balzer | |
| 2014/0310186 A1* | 10/2014 | Ricci | H04W 4/80 |
| | | | 705/302 |
| 2015/0294422 A1 | 10/2015 | Carver et al. | |
| 2017/0053461 A1 | 2/2017 | Pal et al. | |
| 2017/0147990 A1 | 5/2017 | Franke et al. | |
| 2017/0307435 A1 | 10/2017 | Park | |
| 2019/0107998 A1* | 4/2019 | Hawk | G01P 15/0891 |
| 2020/0013160 A1* | 1/2020 | Francis | G01N 21/958 |
| 2020/0175783 A1* | 6/2020 | Adams | G06T 7/001 |
| 2020/0342726 A1 | 10/2020 | Iserentant et al. | |
| 2021/0097315 A1* | 4/2021 | Carruthers | G08B 13/19645 |

\* cited by examiner

SYSTEM FOR DETECTING WINDOW OR GLASS PANEL DAMAGE

BACKGROUND

The disclosure is related to a system for detecting window or glass panel damage, and is especially related to a system for detecting window damage on vehicle windows or glass panel damage on bus shelters.

Motor vehicle windows are typically formed by two kinds of glass. Laminated glass is used in the windshield, i.e. it is made of several layers of glass and elastic material (foil) in between, so that it does not tend to shatter, but instead will fracture. Tempered glass is usually used on the side and back windows of the vehicle, which will be completely shattered and if not shattered, a hole is formed completely through the glass.

Damage to this kind of laminated glass often starts as a small crack or rubble damage when initially struck which may be very difficult to detect, but may grow into a large crack over time.

It is thus important that rubble damages or small cracks are fixed to increase the service interval for the vehicle window, especially windshields. If humidity and dirt goes into the elastic material (foil) it gets almost impossible to repair with good results.

Especially where the temperature alternates between warm and cold weather it will be tension in the glass—and if one then drives in a dump on the road, one will risk that the windshield cracks.

Accordingly, it is thus important to repair the vehicle window as soon as possible, especially for vehicles having large windshields. E.g. repairing of a bus or truck windshield will increase the service life with several months or even years. It is further considerable costs to save, as if one do not repair the vehicle window, a new windshield will have to be arranged that constitute a substantial cost, as well as labour charges for performing the exchange of the window. Accordingly, there is a large potential for cost savings, especially for bus, truck, rental car, carpool fleets, home care vehicle fleets etc. It should further be mentioned that in connection with windshields there are often located sensors and cameras at interior surface of the windshield, which would require adjustment/resetting after installation of a new windshield. With a repair, this would not have to be done as long as the window damage is not in front of the sensors or cameras. Such adjustment or resetting requires skilled personnel and advanced systems.

There is accordingly a need for a system for detection of vehicle window damage in real time that is not dependent on alerts from the drivers, as mentioned above, such rubbles damages or small cracks are difficult to detect by visual inspection. It is also a known fact that drivers will have to pay their main attention to the driving to drive safely instead of focusing on possible window damages.

From U.S. Pat. No. 9,076,277 BB it is known a method to detect objects striking the windshield or other glass in a vehicle and report this at the conclusion of a vehicle rental transaction. A microphone or other device capable of detecting the sound of objects striking the windshield or glass of a vehicle is used to convert the sound into an electrical signal which is further processed and results of a suspected glass strikes are stored. This stored result is communicated to the rental agency following the completion of the rental period so that a thorough inspection for damage can be made and such damage can be assigned to the responsible party. This solution is based on arranging a sound detector in the vehicle, e.g. on the dashboard of the vehicle in the area underneath the laminated glass windshield or directly on the windshield and windows of the vehicle. However, this solution is based on the use of only one acoustic transducer/microphone arranged inside the vehicle, and is further based on the reports of possible window damages are communicated to the rental agency after the completion of a rental period. Accordingly, there is no real time communication, and the solution is not arranged for registering window damages automatically on-line. A further drawback of this solution is that it is not arranged for detecting collisions resulting in window damage. Further, by using only one acoustic transducer/microphone there is not possible to gain any position information of the window damage, resulting in that the entire window will have to be visually inspected, which is both time consuming and gives further no guaranty that the damage is detected. Even if a stone hits a window this does not mean that the window will be damaged, resulting in that the visual inspection of the entire window is unnecessary.

EP 0605993 A2 describes a security sensor system for a vehicle including a security sensor comprising: accelerometer means for monitoring vibrations within the body of said vehicle and generating force signals representative of said vibrations; acoustic monitor means for sensing acoustic energy within the interior of said vehicle and generating acoustic signals representative of said acoustic energy; microwave motion sensing means for detecting motion within the interior of said vehicle and generating motion detection signals representative of sensed motion; and processor means coupled to said accelerometer means, said acoustic monitor means and said microwave sensing means for analysing said acoustic signals and said force signals to detect glass breakage within said vehicle and for analysing said motion detection signals to detect intrusion into the interior of said vehicle.

In U.S. Pat. No. 5,627,509 A it is described a glazing unit security system having an electrically conductive strip of polymeric material self-adhered to the surface of a tempered glass pane. There are further arranged security means electrically connected to the conductive strip sensing and responding to a loss of electrical continuity of the conductive strip. The conductive strip is non-self-integral, such that it would not survive with electrical continuity a fracture of the underlying glass panel. Since a fracture of the tempered glass panel will result in overall fracturing of the panel, it would cause loss of electrical continuity of the conductive strip. The security system further includes an alarm or other device responsive to a loss of electrical continuity of the conductive strip.

From US 2014/201022 A1 it is known a vehicle damage processing and information system determining an estimate of damage to a surface area of a vehicle. The system may include a scanner that generates scanning data representative of a surface area of the vehicle. The system may also include a computing device that processes the scanning data to detect damage items and generates an estimate of damage using the processed scanning data.

In publication "Space and time effects of stress on cracking of glass", in Materials Science and Engineering: A, ELSEVIER, AMSTERDAM, NL, Jun. 25, 2009, by Bao Y. et al., it is presented a report where space effects of applied stresses on cracking was investigated by examining the influence of the stress gradient around an embedded particle on the cracking and fracture of the glass.

Rubble damage or small cracks can further be visually difficult to detect, and especially for larger windshields. It will thus be a need for a system for detecting window damage that further can indicate/locate position of the damages.

There is further a need for a system for detecting window damage enabling shorter time from detected vehicle window damage to repair.

The prior art solutions further suffer from not being capable of ensuring that innocent drivers are not wrongly tied to window damages, especially for vehicles driven by different drivers.

The prior art solutions further suffer from that they are not capable of detecting collision or scratching damages to a vehicle window.

Prior art solutions further suffer from that they cannot report window damages directly to a vehicle service workshop.

Further, bus shelters comprising glass panels are exposed to considerable vandalism by that the glass panels are crushed. Often there are several vandalism episodes in the same area. This results in that there is a need for detecting glass damage automatically, in real-time, online, such that possible personnel can respond to this incident, as well as cleaning the ground for broken glass which constitute a risk for both animals and humans, as well as rapid replacement of the glass panel. Present there exists no system with such a feature.

SUMMARY

Provided herein is a system for detection of window or glass panel damage partly or entirely solving the lacks of prior art.

Also provided is a system capable of registering window or glass panel damage automatically, in real-time, on-line.

Also provided is a system ensuring that innocent drivers are not wrongly tied to a vehicle window damage.

Also provided is a system for detecting window or glass panel damage arranged for filtering data and provided with a machine learning system that filter out sensor records having suspicious values.

Also provided is a system for detecting window or glass panel damage capable of achieving position information of a vehicle window damage.

Also provided is a system for detecting vehicle window damage capable of reporting vehicle window damages directly to a vehicle service workshop.

Also provided is a system for detecting bus shelter glass damage capable of reporting bus shelter glass damages directly to a bus shelter service workshop or alarm central.

The disclosed embodiments are related to system for detecting window or glass panel damage by monitoring, registering and alerting on-line, in real-time, when and if a window or glass panel damage is detected, and in particular related to detection of vehicle window damage or bus shelter glass panel damage for bus shelters comprising glass panels. By vehicle window is herein included windshield, side window and rear window. The inventive embodiments have the main focus on the windshield of vehicles and glass panels of bus shelters.

The disclosed system comprises at least one sensor device adapted to be arranged in connection with an exterior or interior surface of the vehicle window or glass panel. A vehicle will in this connection typically be a bus, truck, rental car, carpool fleets, home care vehicle fleets, etc.

The sensor device according to the disclosure comprises a housing or encapsulation accommodating a sensor module. The sensor module comprises at least one accelerometer or at least one acoustic sensor, optionally at least one of both. By means of the sensor module the sensor device will be capable of detecting any vehicle window or bus shelter glass damage, from very small damages, such as scratches, rubble damages or small cracks, to more serious damages from collisions.

According to yet a further embodiment of the sensor device, the sensor module further comprises at least one temperature sensor.

The sensor device is further provided with a sensor control device provided with means and/or software for acquiring sensor data from the sensor module and perform coarse pre-filtering of data and signals from the sensor module.

According to a further embodiment of the sensor device, the sensor control device is provided with internal or external memory for storing of sensor data from the sensor module after pre-filtering. This solves the problem one comes in when the amount of data gets too big. If it gets too much data that is supposed to be explained in one time, the big amount of data will be inhibited on the creative process. Through a methodical reduction of the present data basis, one can reduce that problem.

According to a further embodiment of the sensor device, the sensor control device is provided with a database containing acoustic signatures or accelerometer signatures of vehicle window damages or bus shelter glass panel damages, and the sensor control device is provided with means and/or software for comparing measurements of the acoustic sensor(s) or accelerometer(s) of the sensor module with the stored acoustic signatures or accelerometer signatures in the database to detect vehicle window damages or bus shelter glass panel damages.

According to a further embodiment of the system, the sensor control device is further provided with means and/or software for calculating the position of the vehicle window damage based on information from at least one sensor device.

In a further embodiment, the sensor control device is provided with means and/or software for calculating the position of the vehicle window damage based on information from at least two sensor devices spaced apart in longitudinal and/or transversal direction on exterior or interior surface of the vehicle window. By that the sensor devices are arranged with fixed and known location on the interior or exterior surface of the vehicle window, the measurements made by the at least two sensor devices can be used to calculate the location of the damage, e.g. by triangulation.

In an alternative embodiment the sensor devices comprises at least two accelerometers or acoustic sensors, spaced apart in the sensor device, enabling triangulation to calculate the location of the damage, similar to the use of at least two sensor devices.

The use of at least two sensor devices arranged to the vehicle window will increase the accuracy of location of the window damage.

In a further embodiment of the sensor device, the sensor module further comprises at least one smoke, gas and/or fire detection sensor by measuring gas and fire detection from at least VOC (Volatile Organic Compound) and/or the level of CO (Carbon Monoxide) and/or CO2 (Carbon Dioxide).

In a further embodiment of the sensor, the sensor module further comprises sensors to measure the general environment around the sensor module, including motion and movement, sound and noise, temperature, humidity and light.

By means of temperature and/or smoke and/or fire detection sensor an early warning of a possible fire is achieved.

First of all, the fact that the sensor devices detect a window damage ensures the safety in that there in fact is a window damage. Further, the use of several sensor devices, or sensor devices including both accelerometer and acoustic sensor can be used to increase the certainty that a window damage in fact is a window damage. Further by that one in addition have position information one can go directly to the point/location of damage and there is no need for visual inspection of the vehicle window to locate this window damage.

The sensor device is further provided with at least one wireless communication device, such as Wi-Fi or Bluetooth, for internal communication with other sensor devices and/or a data acquisition unit. The wireless communication device can be a one directional communication device or bidirectional communication device. By using a bidirectional communication device it is possible to change settings of the sensors in the sensor module, perform update of software in the sensor device and perform troubleshooting, as well as form a MESH network.

The sensor device according to the disclosure further comprises power supply means. The sensor device can be connected to a power supply system of the vehicle directly or to a power grid in connection with bus shelters by means of a power module, and/or the sensor device can be provided with at least one energy storage, such as battery or super capacitor, and/or energy harvester. According to one embodiment of the energy harvester, at least one energy harvester is capable of providing at least a part of the energy required to operate the sensor device. The energy harvester can e.g. be a resonant mechanical device in a material capable of generating electric power when subjected to mechanical influence (e.g. acceleration, rotation, bending, etc.), for example a piezoelectric device or be a device capable of transforming mechanical energy or kinetic energy, for example from mechanical vibration, or solar energy into electric energy. According to one embodiment, the energy harvester is coupled to an energy storage, such as one or more (Lithium) batteries, or super capacitor.

According to a further embodiment, the sensor control device is provided with means and/or software for filtering transient noise from the vehicles power supply, and storing required amounts of power in the energy storage to operate the associated sensor(s).

According to a further embodiment of the system it further comprises a data acquisition unit arranged in the vehicle or the bus shelter provided with a local wireless communication, such as Wi-Fi or Bluetooth, device for communication with the at least one sensor device in connection with the vehicle window or bus shelter glass panel, respectively.

The data acquisition unit is further provided with an external wireless communication device in the form of GSM, Wi-Fi, NB long range radio, NB-LTE, LoRa or similar long range communication enabling communication with external cloud or local server for storage of measured sensor data from the sensor devices.

The data acquisition unit can further be provided with a global positioning system, such as a GPS, GNSS or Glonass device, enabling location information, as well as time information.

The data acquisition unit will accordingly be arranged for forwarding measured and filtered sensor data from the sensor devices to an external cloud or local server for further processing, where the sensor data is added location and time data.

The data acquisition unit can further be arranged for communication with a vehicle driver platform for retrieving a driver identification code of a driver of the vehicle, and assign this to the sensor data which is forwarded to the external cloud or local server.

The system further comprises a data processing device provided with a data extraction module for extracting data from the external cloud or local server. The data processing device is further provided with means and/or software for digital filtering and machine learning of extracted sensor data. The data processing device is further arranged for storage of filters and machine learning methods.

The date processing device can further be provided with a storage module for storing processed data in the external cloud or local server.

According to one embodiment, a local server and data processing device is arranged at the vehicle or bus shelter, by that the sensor device is provided with the local server and data processing device or that the local server or data processing device are arranged in the vicinity of the sensor device(s).

The data processing device can further be provided with a data processing API (application programming interface) for communication with a filter and data processing platform.

The system according to the disclosure can further preferably comprise an operational device provided with a data extraction module for extracting data from the external cloud or local server. The operational device is further provided with a presentation module comprising means and/or software for presentation of information, messages, warnings, faults and other desired information of the vehicle window or bus shelter glass panel.

The operational device is further provided with one or more report modules, such as report module for workshop and report module for management. The report module for workshop can further be arranged to an API module for workshop and driver of vehicle or service personnel for bus shelters. This API module can further be arranged for communication via SMS and/or APP on a vehicle driver platform or service personnel platform, and platform for workshop API. The report module for management can be arranged to a management module API arranged for communication with a platform for management API.

The data processing device and operational device can according to a further embodiment be arranged on a computer, tablet or similar to form an operation and maintenance centre, or in other words a central administrative system.

Accordingly, the disclosed embodiments provide a solution where vehicle window damage can be registered and reported without delay.

Also provided is a solution where vehicle window damage can be assigned the correct driver. By this, one ensures that innocent drivers are not wrongly accused to have caused damages on the vehicle window.

Also provided is a solution that secures and collects all information about vehicle window damages or bus shelter glass panels which can be used to arrange repair action, learning, as well as discover and eliminate risk.

The disclosed embodiments also provide documentation of one or more of: location, time, as well as identification code, for driver of the vehicle ensuring full documentation of a vehicle window damage. This will also contribute to make it possible to document and save vehicle window damage per person.

The combination of sensor data and location data also makes it possible to detect hard positions for vehicles to pass (repeated vehicle window damages on same location). By connecting time and location of a vehicle window damage, this can be used to inform drivers of potential problem areas during driving, such as e.g. traffic signs, branches or other protruding objects representing a risk for vehicle window damage. This will also be related to roads with gravel, resulting in that the driver can reduce the speed on these roads and reducing the risk of vehicle window damages.

By that, provided herein is a solution where the sensor devices filter out sensor data that have suspicious values, this will reduce the amount of sensor data that is saved, and which requires further processing and evaluation, hereunder that the sensor data that is to be processed is related to a relevant vehicle window damage or bus shelter glass panel damage event.

Further preferable features and advantageous details of the inventive embodiments will appear from the following example description, claims and attached drawings.

BRIEF DESCRIPTION OF THE DRAWINGS

The present invention will below be described in further detail with reference to the attached drawings, where.

DETAILED DESCRIPTION

Figure 1:
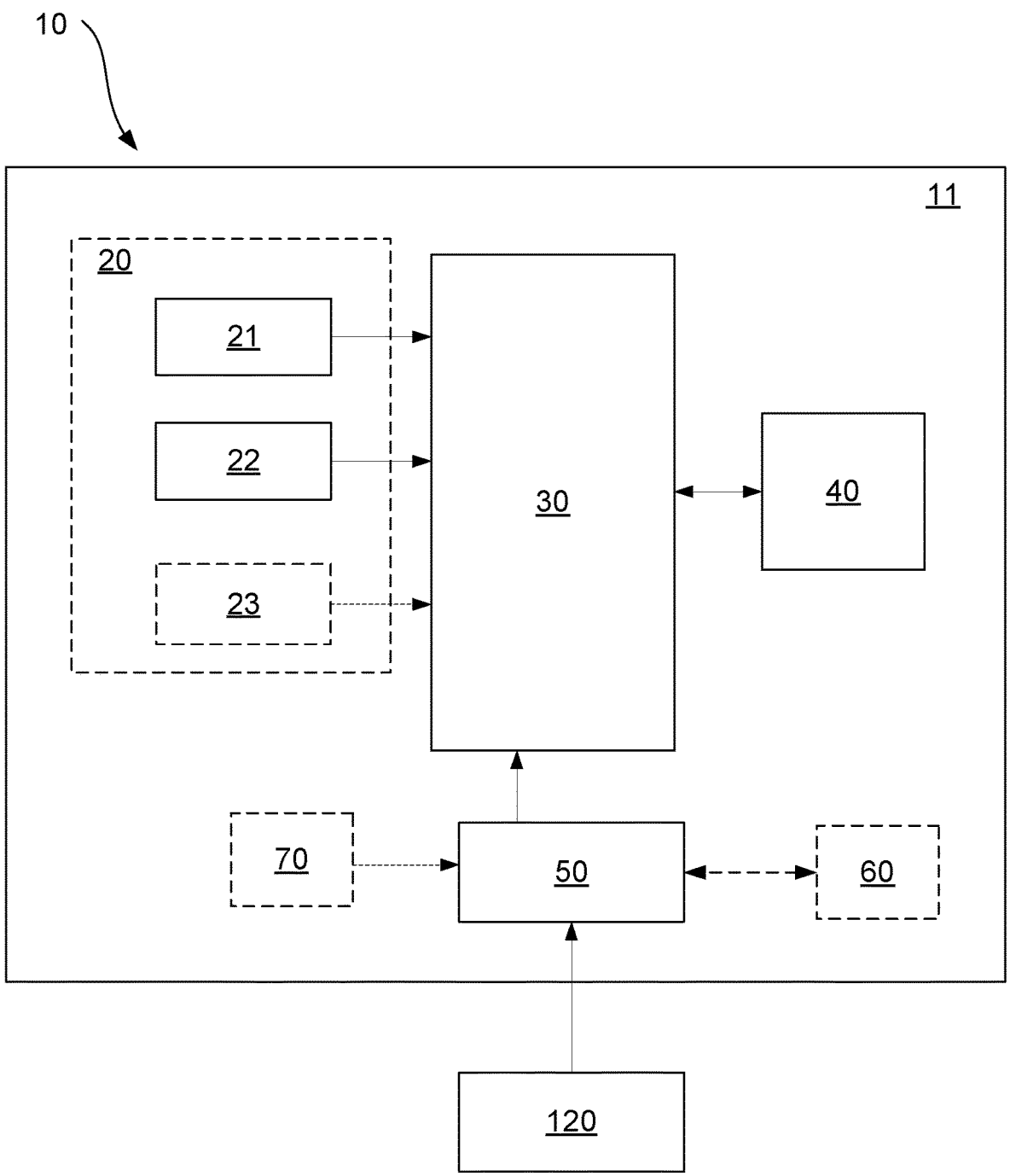
FIG. 1 is a principle drawing of a sensor device according to the disclosure.
Figure 2A:
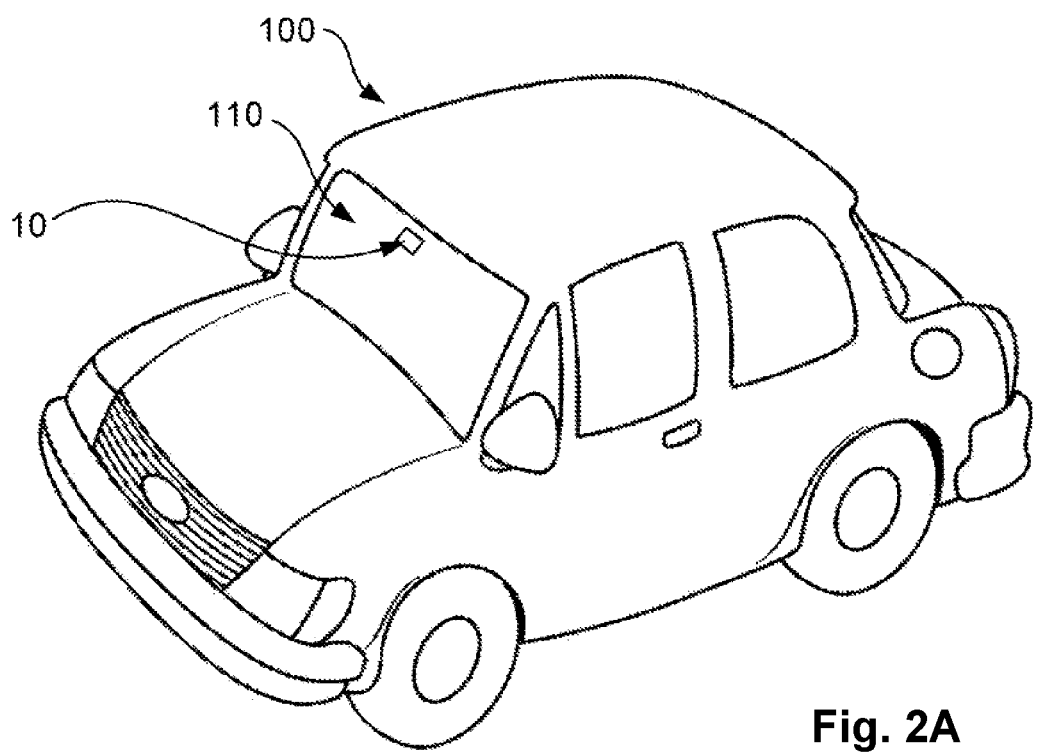
FIGS. 2A-2B are principle drawings of arrangement of sensor device(s) according to the disclosure on interior or exterior surface of a vehicle window.
Figure 2B:
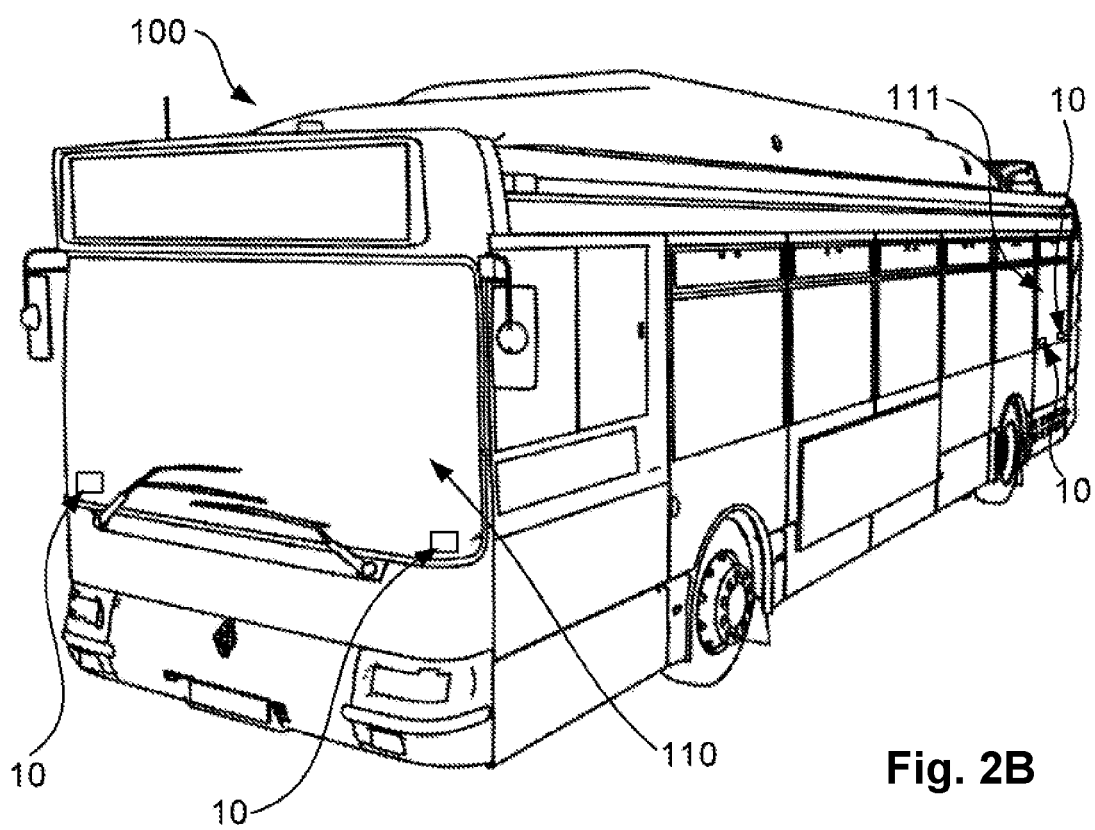
Figure 2C:
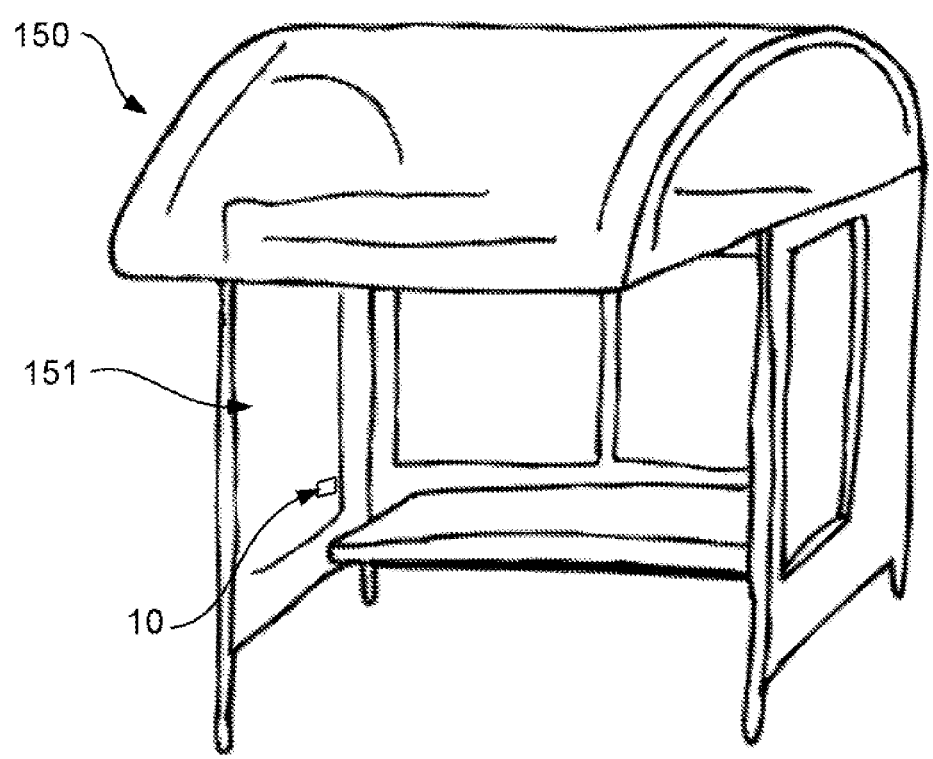
FIG. 2C is a principle drawing of arrangement of sensor device according to the disclosure on interior or exterior surface of a glass panel of a bus shelter.

Reference is now made to FIG. 1 which is a principle drawing of a sensor device 10 adapted for arrangement to interior or exterior surface of a vehicle window 110-111 of a vehicle 100, as shown in FIGS. 2A-2B or to interior or exterior surface of a glass panel 151 of bus shelter 150, as shown in FIG. 2C. The sensor device 10 can e.g. be arranged to the interior or exterior surface of the window 110-111 or glass panel 151 by means of double-sided tape, glue or similar attachment means. The sensor device 10 is formed by a housing or encapsulation 11 adapted for accommodating a sensor module 20, sensor control device 30 and sensor communication device 40. In connection with arrangement of the sensor device 10 on exterior surface of vehicle window 110-111 or glass panel of a bus shelter 150, the encapsulation would need to provide a sealed housing or encapsulation 11 to protect the sensor device 10 from moisture, temperature, wind etc. The sensor module 20 comprises at least one accelerometer 21 or at least one acoustic sensor 22, or at least one of both. In a further embodiment the sensor module 20 can further comprise at least one temperature sensor 23.

The sensor device 10 is further provided with a power module 50 provided with means and/or software, such as filters, DC/DC converter, (low drop-out) regulator, for adapting and controlling voltage and current supplied to components of the sensor device 10 from a vehicle power supply or power grid 120 and/or the sensor device 10 can be provided with an energy storage 60, e.g. in the form of one or more super capacitors and/or batteries providing power or back-up power. The power module 50 will preferably, if the sensor device 10 is powered by the vehicle power supply or power grid 120, be provided with at least one charger circuit for adapting and controlling voltage and current for charging of the energy storage 60. Alternatively, or in addition, the sensor device 10 can be provided with an energy harvester 70 providing power to charge the at least one energy storage 60 and allow the sensor device 10 to function when the motor of the vehicle is stopped or in failure in the power grid.

In embodiments where back-up power is not required, the energy storage 60 and energy harvester 70 can be omitted and the sensor device 10 can be connected directly to the vehicle power supply or power grid 120.

The sensor communication device 40 is preferably a short range wireless communication device, such as Wi-Fi, Bluetooth or similar. The sensor communication device 40 is arranged for one-directional or bi-directional communication enabling communication with a data acquisition unit 80, further described below. In the case the communication device 40 is arranged for bi-directional communication this will enable the sensor devices 10 to form a MESH network, as well as change settings of the sensors 21-23 in the sensor module 20, perform update of software in the sensor device 10 and perform troubleshooting.

According to a further embodiment, the sensor control device 30 is provided with means and/or software for filtering transient noise from the vehicles power supply 120, and storing required amounts of power in the energy storage 60 to operate the associated sensor(s) 21-23.

By that the sensor device 10 is provided with temperature sensor 23 this would give valuable information in which temperatures a rubble damage or small crack results in a more severe damage. This information can be used by machine learning (further described below) to indicate the emergency of a repair. Especially for vehicle windows, temperature is a considerable factor, and especially temperature changes. Vehicles frequently traveling in and out of tunnels will be exposed to large variations in temperature, especially during winter time, that will affect the progress of a vehicle damage. Also, the use of defroster will, especially during winter time, result in large variation in temperature, which will affect the progress of a vehicle damage. Another example of temperature variations is when a vehicle is stored in a heated garage, and when the vehicle is leaving the garage, during winter time, there will be large variations in temperature.

Reference is now made to FIGS. 2A-2B which show examples of arrangement of one sensor device 10 and two sensor devices 10, respectively, to interior or exterior surface of vehicle windows 110-111, exemplified by the windshield 110 and side window 111. In FIG. 2A where one sensor device 10 is arranged, the sensor device 10 is preferably arranged at sides or corners thereof, but can also be arranged close to center of the vehicle window 110, e.g. at upper or lower side of the window 110. Especially for automobiles, as shown in FIG. 2A, which have sensors arranged close to center in upper part of the windshield 110, as mentioned above, the sensor device 10 can be integrated with the existing sensors. In the embodiment of FIG. 2B two sensor devices 10 are arranged to the vehicle window 110-111, spaced apart in longitudinal and/or transversal direction of the vehicle window 110-111. In the shown examples the sensor devices 10 are arranged at lower part or upper part of the windshield 110 and side window 111, but can also be arranged along sides of the windshield 110/window 111, and further at several of the mentioned locations. For most applications it will be the windshield 110 that is most interesting to monitor, as it is the windshield 110 which is most exposed to damages, especially from little rocks, gravel and road debris flicked backwards from the tyres of cars and vehicles in front of you or passing cars and vehicles, and the fact that the windshield 110 is the most expensive window on a vehicle 100, as discussed above. Further, side windows 111 far back on e.g. a bus will be difficult for the driver to detect during driving.

Reference is also made to FIG. 2C which shows an example of arrangement of one sensor device 10 to interior or exterior surface of a glass panel 151 of a bus shelter 150. As for the vehicle window 110-111, the sensor device 10 arranged to the glass panel 151 is preferably arrange close to sides or corners thereof, either at upper or lower side thereof, but can also be arranged close to center if desired.

Figure 3:
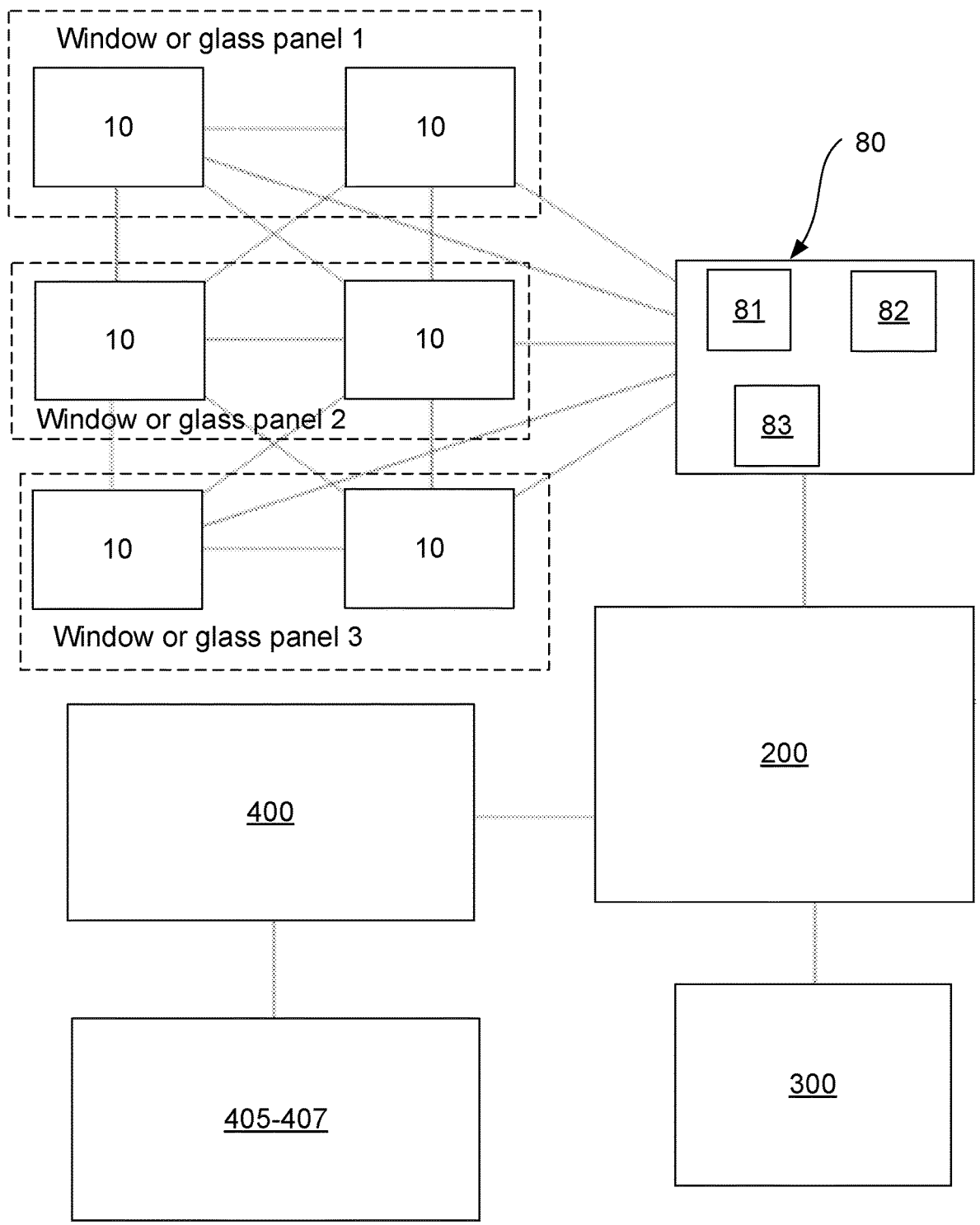
FIG. 3 is a principle drawing of a system according to the disclosure.

Reference is now made to FIG. 3 which is a principle drawing of a system. It should be noted that FIG. 3 shows two sensor device 10 per window or glass panel, but this is only illustrative and the number of sensor device can also be one. The system comprises in addition to the mentioned sensor devices 10 arranged to the vehicle window 110/111 or bus shelter glass panel 151, a data acquisition unit 80 arranged in the vehicle 100 or bus shelter 150 provided with a local communication module 81 arranged to communicate wirelessly with the sensor devices 10 arranged on the vehicle window 110-111 or bus shelter glass panel 151. The data acquisition unit 80 is further provided with an external communication module 82, such as GSM, Wi-Fi, NB long range radio, NB-LTE, LoRa or similar type of long range communication, arranged to forward the measured sensor data by the sensor devices 10 to an external cloud (web) or local server 200 for storage of sensor data.

The data acquisition unit 80 is in a further embodiment provided with a global positioning system 83 providing position information of the vehicle 100 or bus shelter 150 and the sensor devices 10 arranged thereon.

The data acquisition unit 80 can further be arranged for communication with a vehicle driver platform 405 or service personnel for bus shelters via the external cloud or local server 200 or via the local 81 or external 82 communication module, enabling the driver to enter its identification code, as well as provide the driver with information, messages, warnings, faults or similar information related to the vehicle windows 110-111 or bus shelter glass panel 151.

The system further comprises a data processing device 300 provided with means and/or software for filtering the sensor data and machine learning of sensor data stored in the external cloud or local server 200.

The system further comprises an operational device 400 forming an Operation and maintenance center. The operational device 400 is further arranged for presentation of vehicle window or bus shelter glass panel information, messages, warnings and faults from stored and filtered sensor data. The operational device 400 is further arranged for communication with one or more of: a vehicle driver platform 405 or service personnel for bus shelters, workshop platform 406 and management platform 407, which will be further described below.

Figure 4:
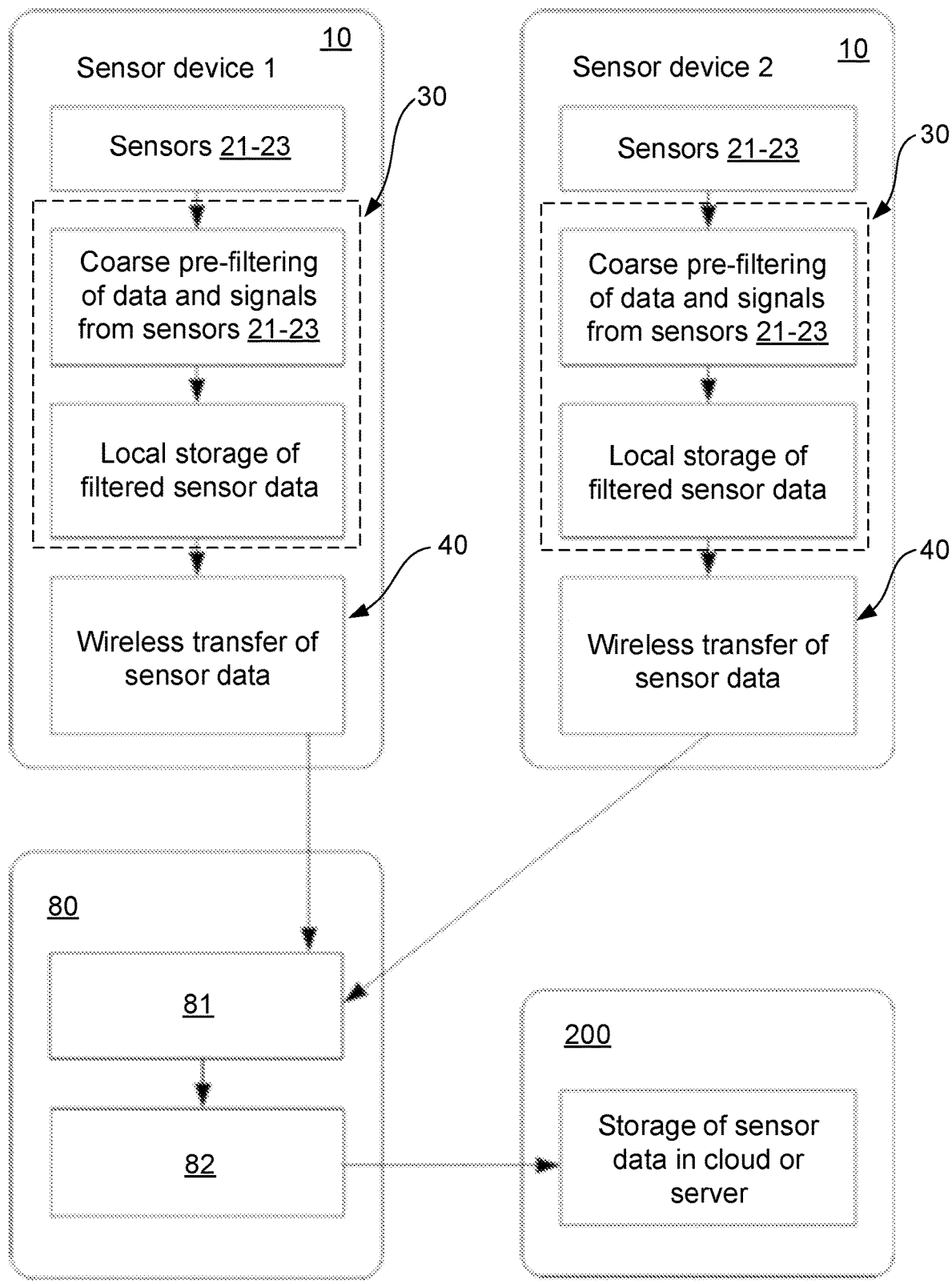
FIG. 4 is a principle drawing of a sensor environment and local processing of sensor data in a system according to the disclosure.

Reference is now made to FIG. 4 which is a principle drawing of a sensor environment and local processing of sensor data in a system. The sensor control device 30 of the sensor device 10 is arranged for collecting sensor data from the sensors of the sensor module 20, and is further provided with means and/or software for performing coarse pre-filtering of data and signals from the respective sensors 21-23, as well as storage of the filtered sensor data on a local memory. The sensor control device 30 is further provided with a database containing acoustic signatures or accelerometer signatures of vehicle window 110-111 damages or bus shelter glass panel 151 damages and the sensor control device 30 is provided with means and/or software for comparing measurements of the acoustic sensor(s) 22 or accelerometer(s) 21 of the sensor module 20 with the stored acoustic signatures or accelerometer signatures in the database to detect vehicle window 110-111 damages or bus shelter glass panel 151 damages. For vehicle windows 110-111 the sensor control device 30 is preferably also provided with means and/or software for calculating the position of the vehicle window 110-111 damage based on information from several sensor devices 10. Accordingly, by e.g. comparing the sound level registered by acoustic sensors 22 and/or accelerometer 21 measurements of sensor devices 10, spaced apart on the inner or exterior surface of the vehicle window 110-111, as well as triangulation, one can calculate the position of the vehicle window damage.

In an alternative embodiment, where only one sensor device 10 is arranged to the vehicle window 110-111, the sensor device 10 is provided with at least two accelerometers 21 or acoustic sensors 22, spaced apart in the sensor device 10, enabling calculation of position based on comparing the sound level registered by the at least two acoustic sensors 22 and/or accelerometer 21 measurements, as well as triangulation.

The sensor data can then next be forwarded to the data acquisition unit 80 via the communication device 40 directly, or via communication devices 40 in other sensor devices 10 forming a MESH Network, by means of the local communication module 81. The data acquisition unit 80 is further arranged to forward the received sensor data to an external cloud or local server 200 via the external communication module 82.

The external cloud or local server 200 is arranged to store sensor data in the external cloud or local server 200 for further processing.

Figure 5:
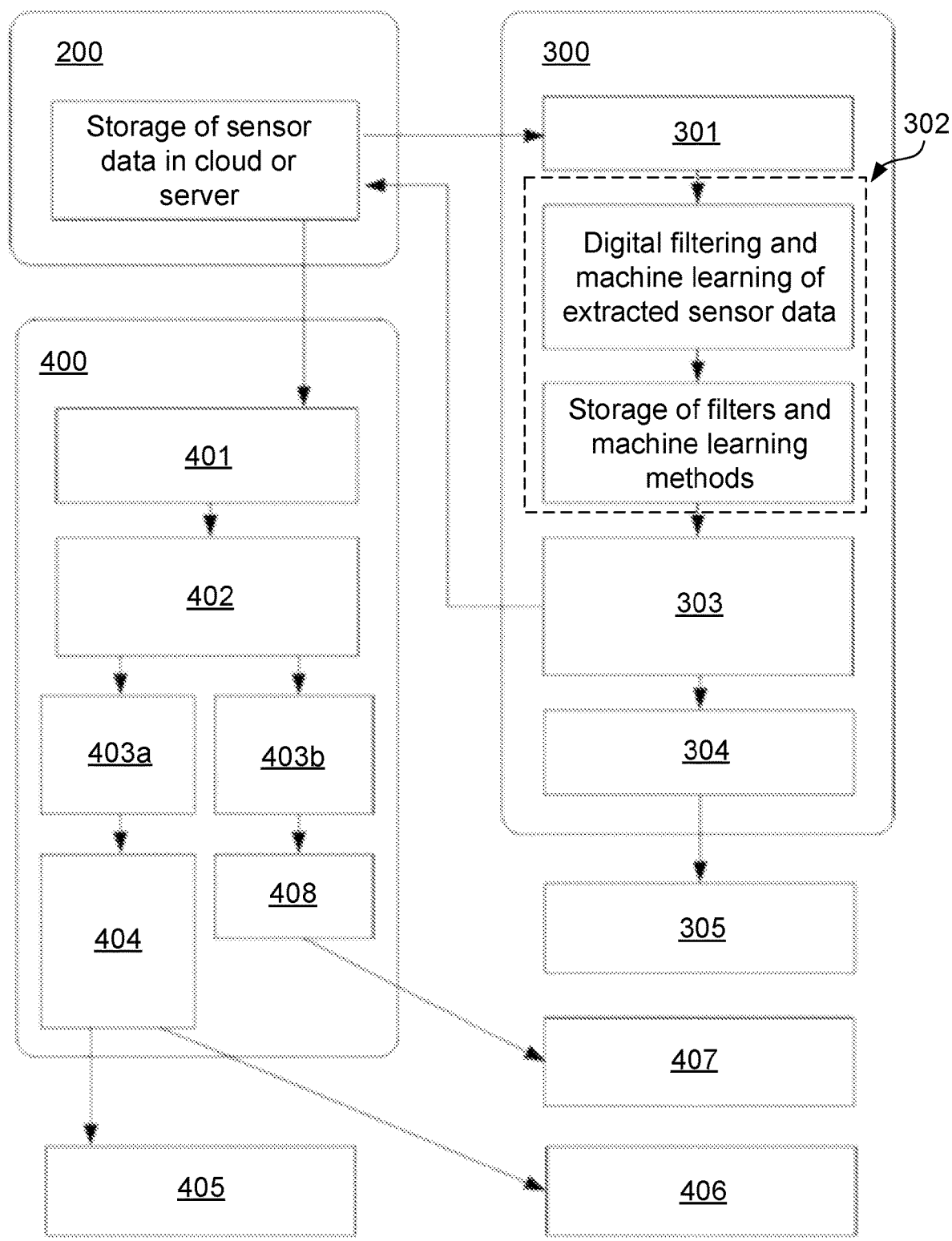
FIG. 5 is a principle drawing of a computing environment of a system according to the disclosure.

Reference is now made to FIG. 5 which is a principle drawing of a computing environment of a system which also shows post (further) processing of collected sensor data.

The system comprises, for post/further processing of sensor data, a data processing device 300 provided with a data extraction module 301 arranged for extracting sensor data from the data storage of the external cloud or local server 200. The data processing device 300 is further provided with means and/or software 302 for digital filtering and machine learning of the extracted sensor data from the external cloud or local server 200, as well as storage of filters and machine learning methods in a storage module 303 for storage of processed data. The storage module 303 is further arranged for forwarding the processed data to the external cloud or local server 200 for storage therein. The data processing device 300 is further provided with a data processing API 304 enabling communication with a filter and data processing platform 305. By means of machine learning one can make predictions or calculations based on large amounts of data. Machine learning can be divided in several methods, which is known as e.g. supervised learning, unsupervised learning, semi-supervised learning and reinforcement learning that enable different approaches for processing of extracted sensor data depending on the result to be achieved. Accordingly, by providing the data processing device 300 with means and/or software 302 for machine learning the extracted sensor data can be processed to find patterns, trends and relationships related to vehicle window 110-111 or bus shelter glass panel 151 damages. In addition, the data processing device 300 can be provided with means and/or software for artificial intelligence enabling the data processing device 300 to make (ethical) choices/decisions. Accordingly, machine learning can be used to improve models and provide decision support.

The disclosed system further comprises an operational device 400 provided with a data extraction module 401 for extracting sensor data, as well as processed data from the data processing device 300. The operation device 400 is further provided with a presentation module 402 provided with means and/or software for presentation of information, messages, warnings, fault and other relevant vehicle window or bus shelter glass panel information.

The operational device 400 is provided with one or more report modules 403*a-b*, in the shown example comprising two report modules in the form of a workshop report module 403*a* and a management report module 403*b* enabling relevant information to be distributed to relevant receivers. In the example, the information from the workshop report module 403*a* can be distributed to a workshop or vehicle driver or service personnel for bus shelters by means of an API module for workshop and vehicle driver 404 or service personnel for bus shelters in communication with a vehicle driver platform 405 or service personnel platform and workshop platform 406. E.g. the information can be sent to the vehicle driver platform 405 or service personnel platform where the vehicle driver platform 405 or service personnel platform is arranged to receive and display a SMS or comprises and APP for displaying information. The management report module 403*b* is in the example distributing information to a management platform 407 via a management module API 408.

Accordingly, by means of the operational device 400 relevant information can be tailored the relevant receiver.

By connecting the system with the vehicle's present sensors and informational system, the data from the vehicle can be stored and be available for the data acquisition unit, which further makes the data available for the data processing device 300 and operational device 400.

The sensor device can further be used to detect irregularities at the mounting of a window in a vehicle. The sensor device may be used to search for creaking or squeaking noises indicating that the window may not be correctly mounted in the vehicle. This may indicate undesired tension or stress in the window, and the risk of a damage to occur is thus higher.

The invention claimed is:

1. A system for detecting a position of damage to a vehicle window, comprising:
   at least one sensor device coupled to a surface of a vehicle window;
   the at least one sensor device comprising a housing or encapsulation mounted to the surface and containing therein:
   a sensor module comprising:
   at least one temperature sensor; and
   at least one accelerometer or at least one acoustic sensor;
   a sensor control device configured to perform coarse pre-filtering of sensor data from the sensor module; and
   a communication device,
   wherein the system further comprises a data processing device arranged for extracting sensor data and is configured for digital filtering and machine learning of the extracted sensor data, and
   wherein the system is configured to detect damage to the vehicle window based on the extracted sensor data.

2. The system of claim 1, wherein the at least one sensor device comprises at least two sensor devices spaced apart in longitudinal direction or transversal direction or both of the vehicle window.

3. The system of claim 1, wherein the sensor control device comprises a database containing acoustic signatures or accelerometer signatures of vehicle window damages, and is configured to compare measurements of the at least one accelerometer or acoustic sensor of the sensor module with the stored acoustic signatures or accelerometer signatures in the database to detect vehicle window damages.

4. The system of claim 1, wherein the at least one accelerometer comprises two accelerometers spaced apart from each other in the sensor device.

5. The system of claim 1, wherein the at least one acoustic sensor comprises two acoustic sensors spaced apart from each other in the sensor device.

6. The system of claim 1, further comprising a data acquisition unit comprising a local communication module for communication with the at least one sensor device and an external communication module for communication with an external cloud or local server.

7. The system of claim 6, wherein the data acquisition unit further comprises a global positioning system.

8. The system of claim 6, wherein the data processing device comprises a data extraction module configured for extracting sensor data from the external cloud or local server and a storage module for storing processed data to the external cloud or local server.

9. The system of claim 8, further comprising an operational device with a data extraction module for extracting sensor data and processed data from the data processing device, wherein the operational device further comprises a presentation module configured for presentation of relevant vehicle window information and report modules enabling relevant vehicle window information to be distributed to relevant receiver platforms.

10. The system of claim 1, wherein the sensor control device is connected to a vehicle power supply or power grid.

11. The system of claim 1, wherein the sensor control device is connected to at least one energy storage or energy harvester arranged inside the housing or encapsulation.

12. The system of claim 1, wherein the sensor control device is configured to filter transient noise from a power supply of a vehicle or power grid and store power in an energy storage in an amount sufficient to operate the sensor module.

13. The system of claim 1, wherein the data processing device is configured to process the extracted sensor data to find patterns, trends and relationships of damage to a vehicle window.

14. The system of claim 2, wherein the sensor control device is configured to calculate and locate a position of the vehicle window damage using information from the at least two sensor devices.

15. The system of claim 1, wherein the system is configured to sensor control device is configured to register glass damage and provide an alert in real-time.

16. A vehicle mounted system for detecting and locating positions of damages to a vehicle window, the system comprising:
- a sensor device mounted to an exterior or interior surface of the vehicle window that can be subject to damage, the sensor device comprising:
  - a housing;
  - a sensor module contained in the housing and provided with at least one acoustic sensor and at least one accelerometer,
  - a sensor communication device contained in the housing, and
  - a sensor control device contained in the housing, receiving information from the sensor module, communicating with the sensor communication device, and having a database of stored signatures of window damages and being configured to:
    - perform coarse pre-filtering of sensor data, and
    - compare measurements of the at least one acoustic sensor and/or accelerometer with the stored signatures in the database to detect damages to the vehicle window, and
- a data acquisition unit arranged on the vehicle and comprising:
  - a local communication module for wireless communication with the sensor device via the sensor communication device, and
  - an external communication module for communication with an external cloud-based or local server,
- wherein the vehicle mounted system is configured to detect and locate a position of damage to the vehicle window based on information from the sensor module.

17. A vehicle mounted system for detecting and locating positions of damages to a vehicle window, the system comprising:
- multiple sensor devices mounted to an exterior or interior surface of the vehicle window that can be subject to damage,
- each of the sensor devices comprising:
  - a housing;
  - a sensor module contained in the housing and provided with at least one acoustic sensor and at least one accelerometer,
  - a sensor communication device contained in the housing, and a sensor control device contained in the housing, receiving information from the sensor module, communicating with the sensor communication device, and having a database of stored signatures of window damages and being configured to:
    - perform coarse pre-filtering of sensor data, and
    - compare measurements of the at least one acoustic sensor or accelerometer with the stored signatures in the database to detect damages to the vehicle window, and
- a data acquisition unit arranged on the vehicle and comprising:
  - a local communication module for wireless communication with each of the sensor devices via the sensor communication device, and
  - an external communication module for communication with an external cloud-based or local server,
- wherein the vehicle mounted system is configured to detect and locate a position of damage to the vehicle window based on information from the sensor module.

* * * * *